A. F. W. PARTZ.

Apparatus for Compacting Granular Sugar into Blocks.

No. 6,208 Reissued Jan. 5, 1875.

Witnesses

Jno. L. Boone

C. M. Richardson

Inventor

August F. W. Partz by Dewey & Co

Attys

THE GRAPHIC CO. PHOTO-LITH. 39 & 41 PARK PLACE, N.Y.

UNITED STATES PATENT OFFICE.

AUGUST F. W. PARTZ, OF OAKLAND, CALIFORNIA.

IMPROVEMENT IN APPARATUS FOR COMPACTING GRANULAR SUGAR INTO BLOCKS.

Specification forming part of Letters Patent No. 133,884, dated December 10, 1872; reissue No. 6,208, dated January 5, 1875; application filed September 24, 1874.

DIVISION A.

*To all whom it may concern:*

Be it known that I, AUGUST F. W. PARTZ, of Oakland, in the county of Alameda and State of California, have invented an Improved Apparatus for Compacting Granular Sugar into Blocks, of which the following is a specification:

My invention relates to an apparatus comprising the necessary mechanical devices for depositing loose granular sugar in molds and compacting it therein, for the purpose of having it transformed into cakes or blocks.

The invention consists, mainly, in the combination of a bottomless filling-box with a horizontal pressing cylinder or roller, and rails or tracks beneath them, all being so arranged upon a frame that, when trays or other shallow molds are placed one against another upon the rails and passed under the bottomless box—which is meanwhile supplied with moist granular sugar—and thence under the roller, a layer of sugar will be deposited upon them from the box, and then be compressed by the turning roller. To cause the compression of the sugar to be effected by power transmitted from an engine, a second horizontal cylinder or roller, which can be revolved by means of a pulley or cog-wheel attached to it, is placed directly below the one already mentioned, just far enough from it to allow the molds to pass between, and so that its periphery slightly projects above the plane of the rails. Thus, by the revolution of this roller the molds charged with sugar, being caught between it and the upper one and slightly lifted from the rails, are made to move along while the sugar is being compacted.

In the following full and exact description of my invention reference is had to the accompanying drawings, of which—

Figure 1:
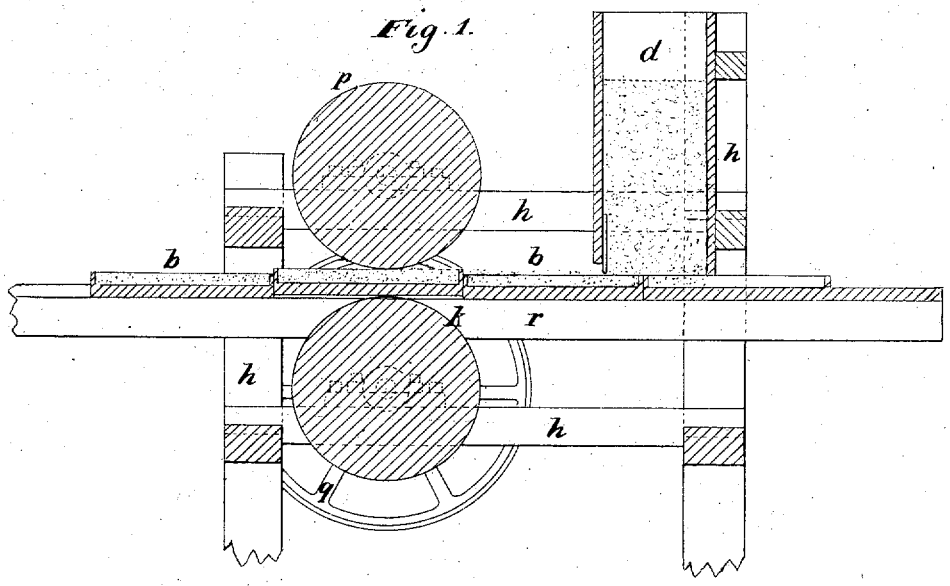
Figure 2:
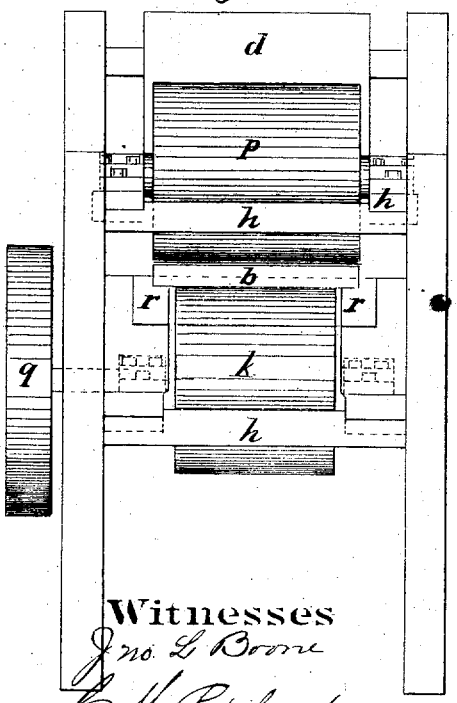
Figure 3:
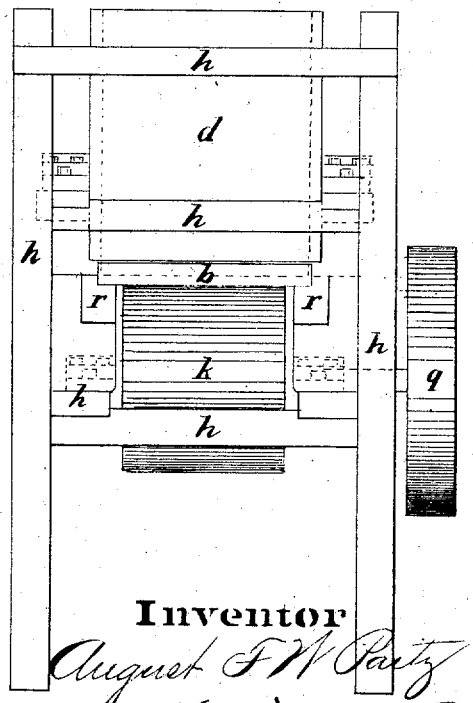

Figure 1 is a vertical longitudinal section, and Figs. 2 and 3 are end elevations, of a machine embodying my invention.

*h* is a strong wooden frame. *r r* are rails or tracks; and *b b*, shallow boxes or trays, constituting molds, that slide upon the rails, by which they are laterally guided. *p* is a cylinder or roller, made of hard wood or any other suitable material, and fastened upon a shaft that rests in bearings, in which it has a slight up-and-down play. *k* is another cylinder or roller, made and supported like *p*, being of the same diameter, but of less length, and fixed upon a shaft which lies in close bearings, and is elongated on one side for having a driving-pulley, *g*, keyed upon it. The relative position of both rollers is such that, when one of the molds *b* is shoved between them upon the rails *r*, it is lifted by the lower one about a sixteenth of an inch from the rails, while the periphery of the upper one is in contact with or close to the raised sides or rims of the mold. *d* is a square wooden box fastened to the frame *h*. Having no fixed bottom, it is successively supplied with a temporary one by the molds *b* as they are passed under it upon the rails, its sides reaching down so as almost to touch the rims of the molds, except the side facing the roller *p*, which is about one-third of the depth of the molds shorter, and the lower part of which is made of sheet metal, because it has to serve as a "strike," leveling the sugar deposited upon the molds, and a thin metallic edge is better suited for that purpose than the edge of a board.

The operation is as follows: The roller *k* having been set in motion by power conveyed by a belt to the pulley *g*, and made to revolve in the direction indicated by an arrow, a workman, standing at that end of the machine which is shown in Fig. 3, places the molds *b* (of which there is a sufficient number to insure a continuous operation) upon the rails *r*, and shoves them, one close after another, under the box *d*, while the same is continually supplied with moist granular sugar, which is dropped into it from an upper floor through a tube made of wood, sheet metal, or some suitable flexible material, the latter being preferable, as in cases of clogging a free passage is readily restored by a stroke against the tube. In passing under the box *d* the molds have a layer of sugar deposited upon them, the thickness of which is regulated by the lower edge of the box next to the roller *p*, so that it rises about one-third of the depth of the molds above their rims. Shoved along upon the rails, the molds charged with sugar are caught, one by one, between the rollers *p* and *k*, and as, by the rotation of the latter, (while the former turns by friction,) they are forced through between them the sugar is compacted to about three-fourths of its former bulk. Being pushed onward after leaving the rollers, the molds are taken off the rails and placed on racks for the sugar to dry and harden.

The molds *b* are represented as mere shallow boxes; but I generally employ such compound molds for the shaping of granular sugar into cubes, blocks, or bars as are described in Letters Patent No. 131,899 and No. 132,921, issued to me October 1 and November 12, 1872. For using molds of this kind the frame of the machine only needs to be made wide enough to allow the handles projecting from them to extend over one of the rails, and to pass outside of the filling-box and beyond the corresponding end of the upper roller.

To be able to regulate the amount of sugar to be deposited upon the molds, the piece of sheet metal forming the lower part of the side of the box *d* facing the roller *p* may be made adjustable.

I claim as my invention—

The combination of the bottomless filling-box *d* with the pressing-roller *p*, the tracks *r*, and molds *b*, substantially as and for the purpose herein described.

AUGUST F. W. PARTZ.

Witnesses:

J. L. BOONE,

C. M. RICHARDSON.